(12) United States Patent
Neubrand et al.

(10) Patent No.: US 7,762,607 B2
(45) Date of Patent: Jul. 27, 2010

(54) OVERCENTER LINKAGE MECHANISM FOR A DECKLID OF AN AUTOMOTIVE VEHICLE

(75) Inventors: Frank Neubrand, West Bloomfield, MI (US); Matthew Ferraiuolo, Pittsford, MI (US)

(73) Assignee: Wilhelm Karmann GmbH, Osnabrueck (DE)

( * ) Notice: Subject to any disclaimer, the term of this patent is extended or adjusted under 35 U.S.C. 154(b) by 555 days.

(21) Appl. No.: 11/614,547

(22) Filed: Dec. 21, 2006

(65) Prior Publication Data

US 2008/0150313 A1    Jun. 26, 2008

(51) Int. Cl.
*B62D 25/10* (2006.01)
(52) U.S. Cl. ......................................................... 296/76
(58) Field of Classification Search .................. 296/76, 296/107.08, 136.07, 136.01, 136.03, 136.04
See application file for complete search history.

(56) References Cited

U.S. PATENT DOCUMENTS

| | | | |
|---|---|---|---|
| 5,775,766 A | 7/1998 | Schaible et al. | |
| 5,823,606 A | 10/1998 | Schenk et al. | |
| 6,164,713 A | 12/2000 | Graf et al. | |
| 6,186,577 B1 | 2/2001 | Guckel et al. | |
| 6,193,300 B1 * | 2/2001 | Nakatomi et al. | 296/107.08 |
| 6,270,144 B1 | 8/2001 | Schenk et al. | |
| 6,352,298 B1 | 3/2002 | Hayashi et al. | |
| 6,619,720 B2 * | 9/2003 | Nicastri | 296/107.08 |
| 6,705,662 B2 | 3/2004 | Sande et al. | |
| 6,824,194 B2 * | 11/2004 | Weissmueller et al. | 296/136.05 |
| 6,899,368 B2 * | 5/2005 | Neubrand | 296/76 |
| 7,201,428 B2 * | 4/2007 | Wagner | 296/107.08 |
| 2003/0025350 A1 * | 2/2003 | Sande | 296/107.08 |

FOREIGN PATENT DOCUMENTS

WO    WO 2006084434 A1 *   8/2006

* cited by examiner

*Primary Examiner*—Patricia L Engle
*Assistant Examiner*—SunSurraye Westbrook
(74) *Attorney, Agent, or Firm*—Gifford, Krass, Sprinkle, Anderson & Citkowski, P.C.; Douglas L. Wathen

(57) ABSTRACT

A decklid linkage mechanism allows movement of a decklid relative to a body of an automotive vehicle. The decklid linkage mechanism includes a frame, an actuator and a linkage mechanism. The frame supports at least a portion of the decklid. The frame is pivotally coupled to the body for movement of the frame and decklid together between a closed position concealing a storage space in the vehicle and a first open position allowing access to the storage space from a first end of the storage space. The decklid is coupled to the frame for movement of the decklid between the closed position and a second open position allowing access to the storage space from a second end of the storage space opposite the first end. The actuator drives the decklid between the closed position and the first open position. The linkage mechanism includes an overcenter arrangement that locks the decklid in the closed position.

22 Claims, 8 Drawing Sheets

OVERCENTER LINKAGE MECHANISM FOR A DECKLID OF AN AUTOMOTIVE VEHICLE

FIELD OF THE INVENTION

The invention relates to decklids for automotive vehicles. More particularly, the invention relates to an overcenter linkage mechanism that is capable of locking the decklid in either closed or open positions without the need for secondary latching mechanisms.

BACKGROUND OF THE INVENTION

Automotive vehicles with convertible tops typically include a storage space in which the top is stowed when fully retracted. The storage space is located behind the passenger compartment. The storage space may be a dedicated space used only for storing the retracted top, or the storage space may be continuous with or part of the trunk space. In either case, it is known to provide a decklid movable to a closed position for concealing both the storage space and the trunk space. The decklid is pivotable in a forward direction allowing access to the trunk space and a rearward direction allowing movement of the top in and out of the storage space.

It remains desirable to provide an overcenter arrangement for locking the decklid in the closed position, thereby eliminating a need for dedicated latches or locks for locking the decklid in the closed position.

SUMMARY OF THE INVENTION

According to one aspect of the invention, a decklid assembly is provided for use on an automotive vehicle. The decklid assembly includes a decklid, a frame, an actuator and a linkage mechanism. The frame supports at least a portion of die decklid. The actuator drives the decklid and frame together between a closed position concealing a storage space in the vehicle and a first open position allowing access to the storage space from a first end of the storage space. The linkage mechanism has a first link pivotally coupled to the frame by a first pivot and a second link pivotally coupled to the vehicle by a second pivot. The first and second links are pivotally coupled to each other by a third pivot. The first and second pivots define an overcenter line for the third pivot. One of the first and second links is coupled to the actuator for driving the linkage mechanism in a first direction during movement of the decklid and frame from the closed position to the first open position and in an opposite second direction during movement of the decklid and frame from the first open position to the closed position. The third pivot is movable from an overcenter position on one side of the overcenter line to an opposite side of the overcenter line as the linkage mechanism is moved in the first direction toward the first open position. The movement of the linkage mechanism is constrained in the second direction when the third pivot is in the overcenter position to help retain the decklid and frame in the closed position.

According to another aspect of the invention, a decklid assembly provides movement of a decklid relative to a body of an automotive vehicle. The decklid assembly includes a frame and a linkage mechanism. The frame supports at least a portion of the decklid. The frame is pivotally coupled to the body for movement of the frame and decklid together about a first decklid pivot between a closed position concealing a storage space in the vehicle and a first open position allowing access to the storage space from a first end of the storage space. The frame further provides a second decklid pivot about which the decklid is movable relative to the frame between the closed position and a second open position allowing access to the storage space from a second end of the storage space opposite the first end. The linkage mechanism has a first link pivotally coupled to the frame by a first pivot and a second link pivotally coupled to the vehicle by a second pivot. The first and second links are pivotally coupled to each other by a third pivot, the first and second pivots defining an overcenter line for the third pivot, the first and second links being movable in a first direction during movement of the decklid and frame from the closed position to the first open position and in an opposite second direction during movement of the decklid and frame from the first open position to the closed position. The third pivot is movable from an overcenter position on one side of the overcenter line to an opposite side of the overcenter line as the linkage mechanism is moved in the first direction toward the first open position. The movement of the linkage mechanism is constrained in the second direction when the third pivot is in the overcenter position to help retain the decklid and frame in the closed position.

According to another aspect of the invention, a decklid assembly is provided for use on an automotive vehicle. The decklid assembly includes a decklid for covering a compartment in the vehicle. The decklid assembly further includes a linkage mechanism operatively coupled between the decklid and the vehicle to provide movement of the decklid between a closed position concealing the compartment and a first open position to allow access through a first side of the compartment. The linkage mechanism further provides movement of the decklid between the closed position and a second open position to allow access through a second side of the compartment opposite the first side. The linkage mechanism is movable to an overcenter position to prevent movement of the decklid from the closed position to one of the first and second open positions.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
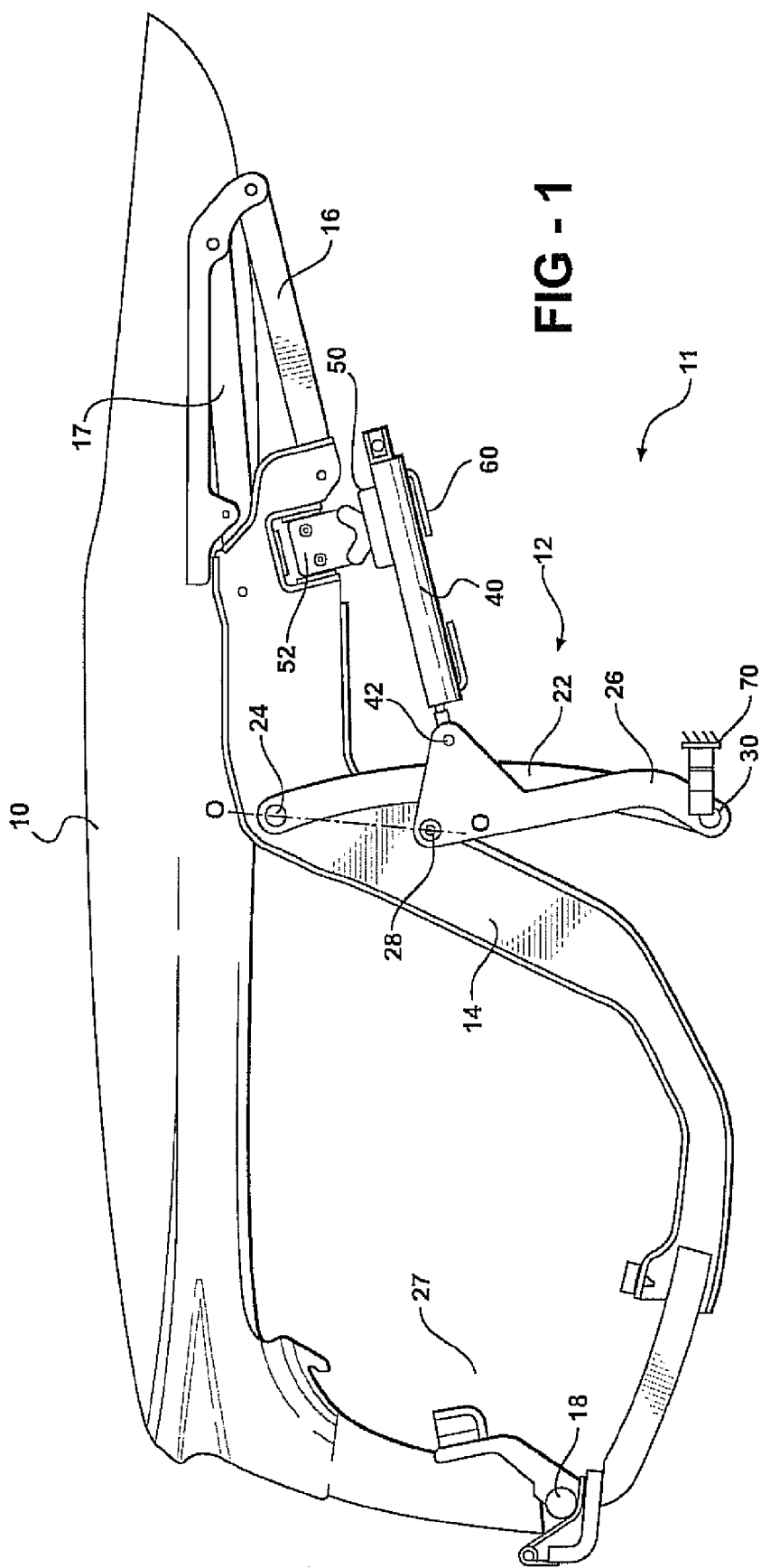
FIG. 1 is a side elevational view of a decklid assembly according to one aspect of the invention in the closed position.
Figure 2:
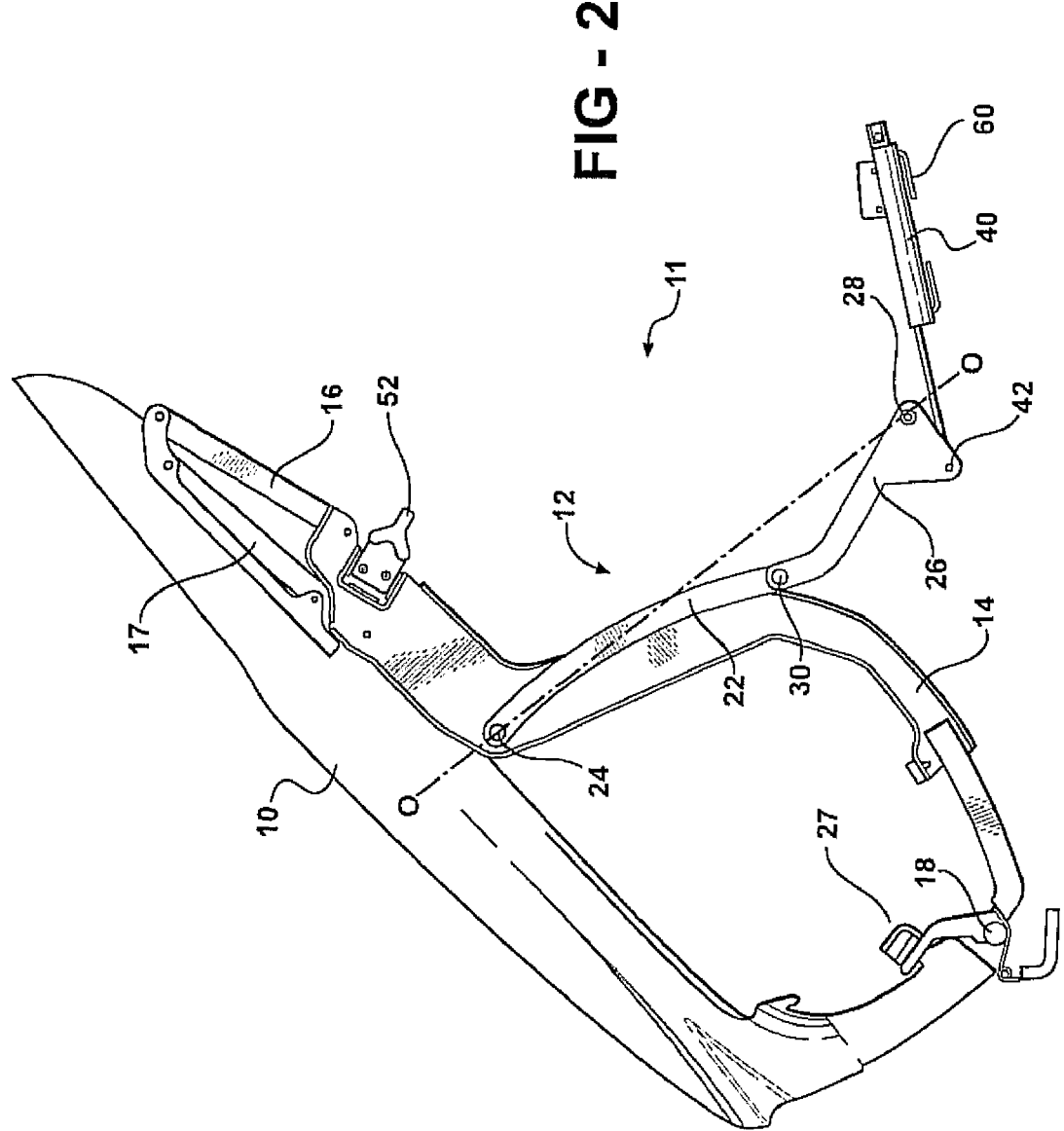
FIG. 2 is a side elevational view of the decklid assembly in a first open position.

Referring to FIGS. 1-5, a decklid assembly 11 is shown for enclosing a storage space in an automotive vehicle. The decklid assembly 11 includes a linkage mechanism 12 and a decklid 10. The linkage mechanism, generally indicated by 12, is coupled between the decklid 10 and the vehicle body (not shown). The linkage mechanism 12 allows movement of the decklid 10 about a decklid pivot 18 between a closed position, as shown in FIG. 1, and a first open position, as shown in FIG. 2. In the first open position, the decklid 10 is tilted about the decklid pivot 18 toward a rear end of the vehicle to allow access to the storage space, or to allow a convertible top to be retracted and stowed therein. In the closed position, the storage space and the contents thereof, such as the convertible top, are concealed by the decklid 10. Described in greater detail below, the linkage mechanism 12 has an overcenter arrangement that retains the decklid 10 in the closed position without the need for a dedicated latching mechanism.

Figure 3:
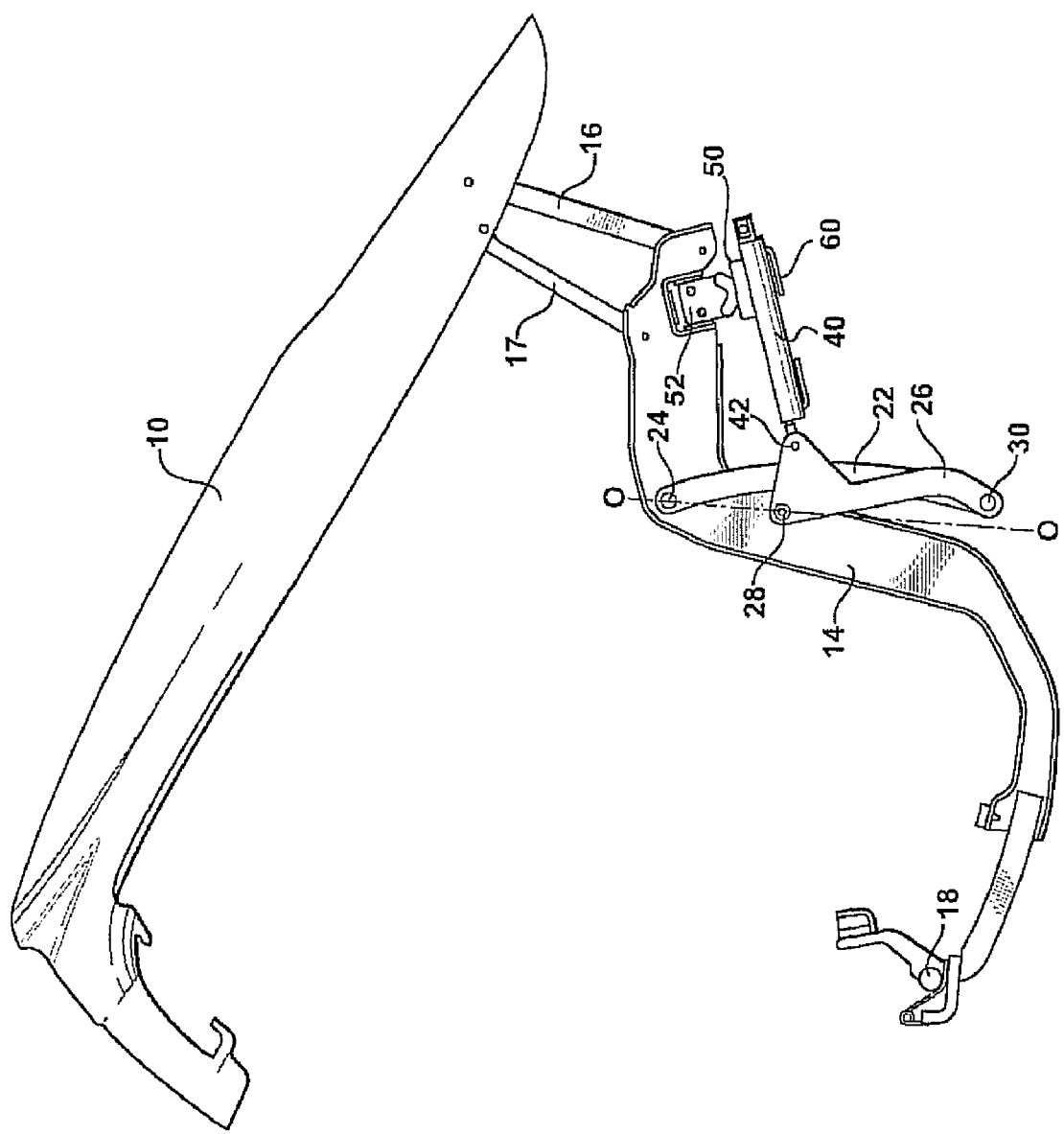
FIG. 3 is a side elevational view of the decklid assembly in a second open position.
Figure 4:
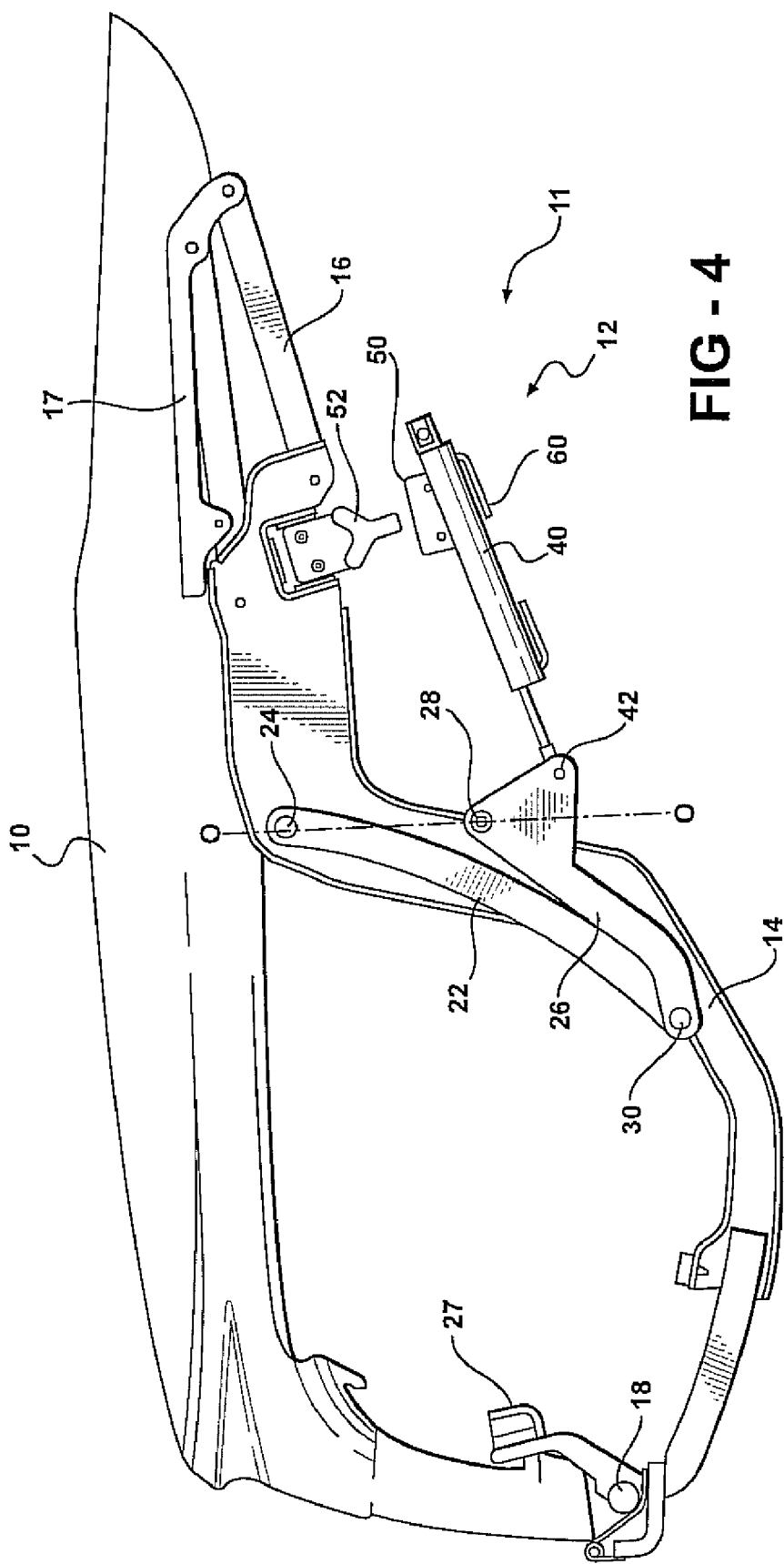
FIGS. 4 and 5 are side elevational views of the decklid assembly in intermediate positions between the closed position and the first open position.
Figure 5:
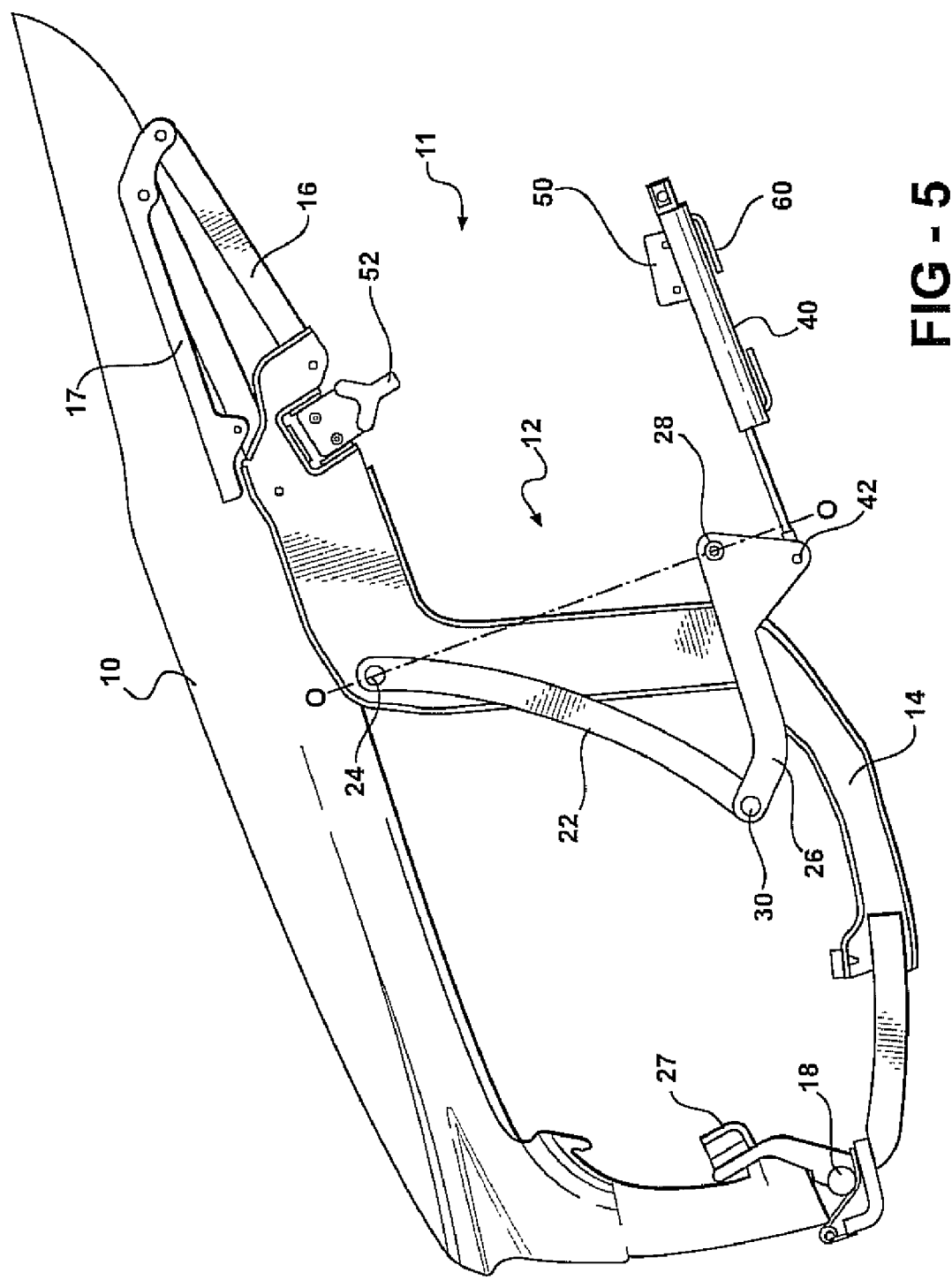

The linkage mechanism 12 includes a frame 14 pivotally coupled to the vehicle at the decklid pivot 18. The decklid 10 is supported by the frame 14 and moves with the frame 14 about the decklid pivot 18 between the closed position and the first open position. Alternatively, the pivot between the frame and the body may be defined by a multilink arrangement. A front end of the decklid 10 is pivotally coupled to the frame 14 by a four-bar linkage 16, 17 for independent movement of the decklid 10 relative to the frame 14 between the closed position, as shown in FIG. 1, and a second open position, as shown in FIG. 3. Alternatively, the decklid and frame may be pivotally coupled to each other by a single pivot instead of the four-bar linkage 16, 17. In the second open position, the decklid 10 is tilted relative to the frame 14 toward a front end of the vehicle to allow access to the storage space from the rear end of the vehicle. A lock mechanism 27 allows the decklid 10 to be releasably locked to the frame 14, so that the decklid 10 and the frame 14 can be moved together about the decklid pivot 18 between the closed position and the first open position.

The linkage mechanism 12 also includes a first link 22 and a second link 26. The first link 22 is pivotally coupled to the frame 14 by a first pivot 24. The second link 26 is pivotally coupled to the vehicle by a second pivot 28. The first 22 and second 26 links are pivotally coupled to each other by a third pivot 30.

Figure 6:
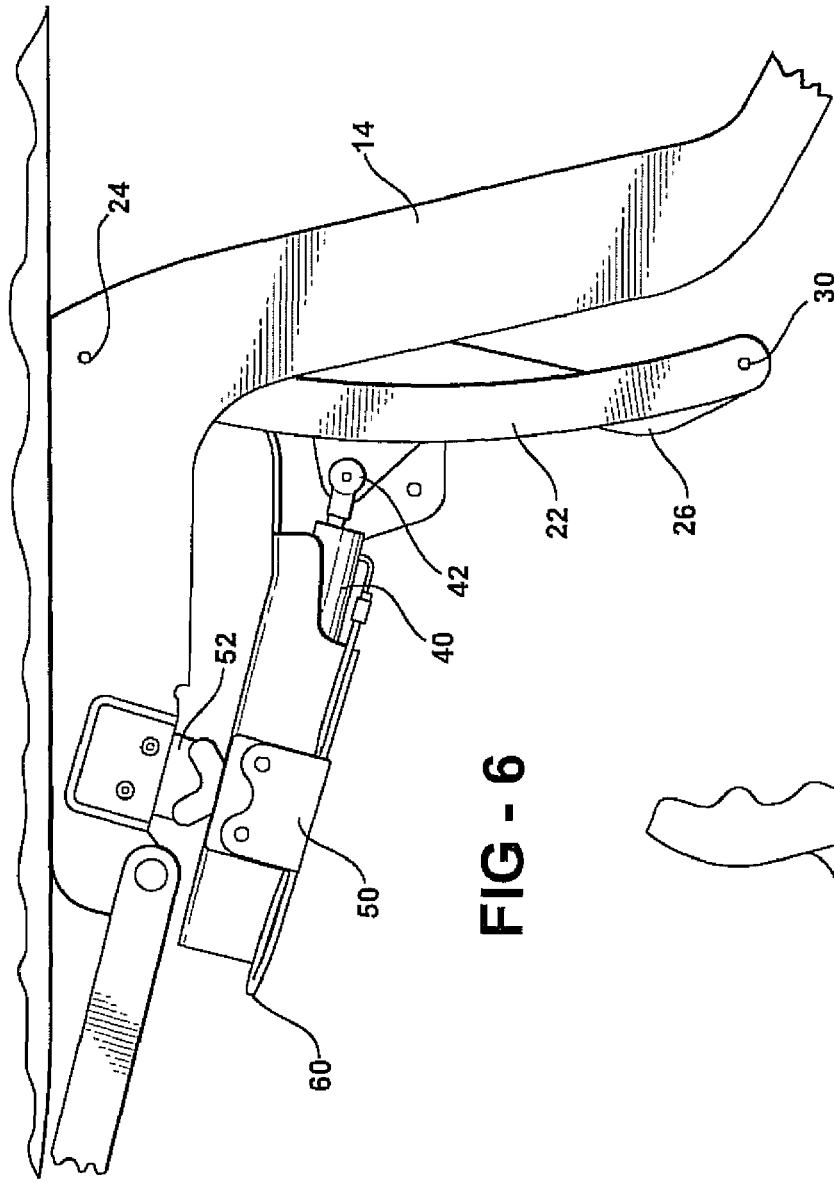
FIG. 6 is a side view of a portion of the decklid assembly in the closed position.
Figure 7:
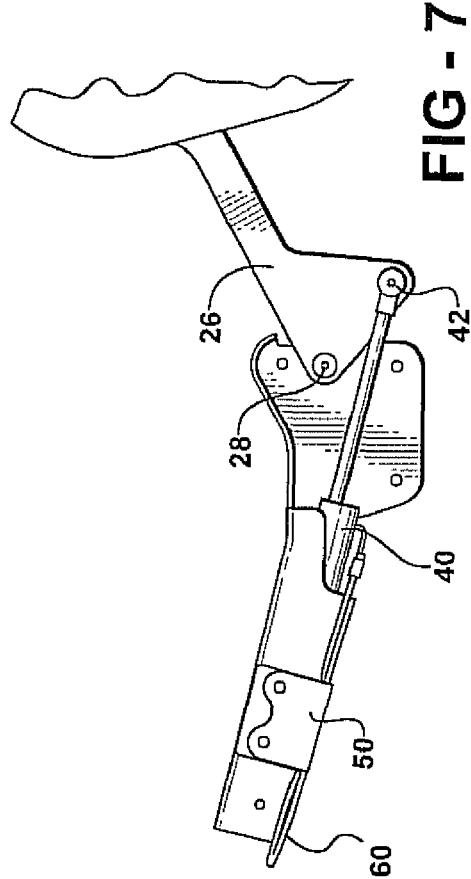
FIG. 7 is a side view of a portion of the decklid assembly in the open position showing an actuator and bracket for coupling the actuator to the vehicle.

An actuator 40 in the form of a hydraulic cylinder is mounted to the vehicle by a bracket 60. An enlarged view of the hydraulic cylinder and bracket 60 is shown in FIGS. 6 and 7. A moving or actuated end of the cylinder is pivotally coupled to the second link 26 by a pivot 42, so that extending or contracting the effective length of the cylinder causes movement of the decklid between the first open position and the closed position, respectively. It should be appreciated by those skilled in the art that other types of actuators may be used. For example, the cylinder may be configured to pull rather than push the linkage mechanism to move the decklid toward the first open position. Alternatively, a rotary-type motor may be coupled to one of the links of the linkage mechanism for driving the decklid between the closed and first open positions.

Figure 8:
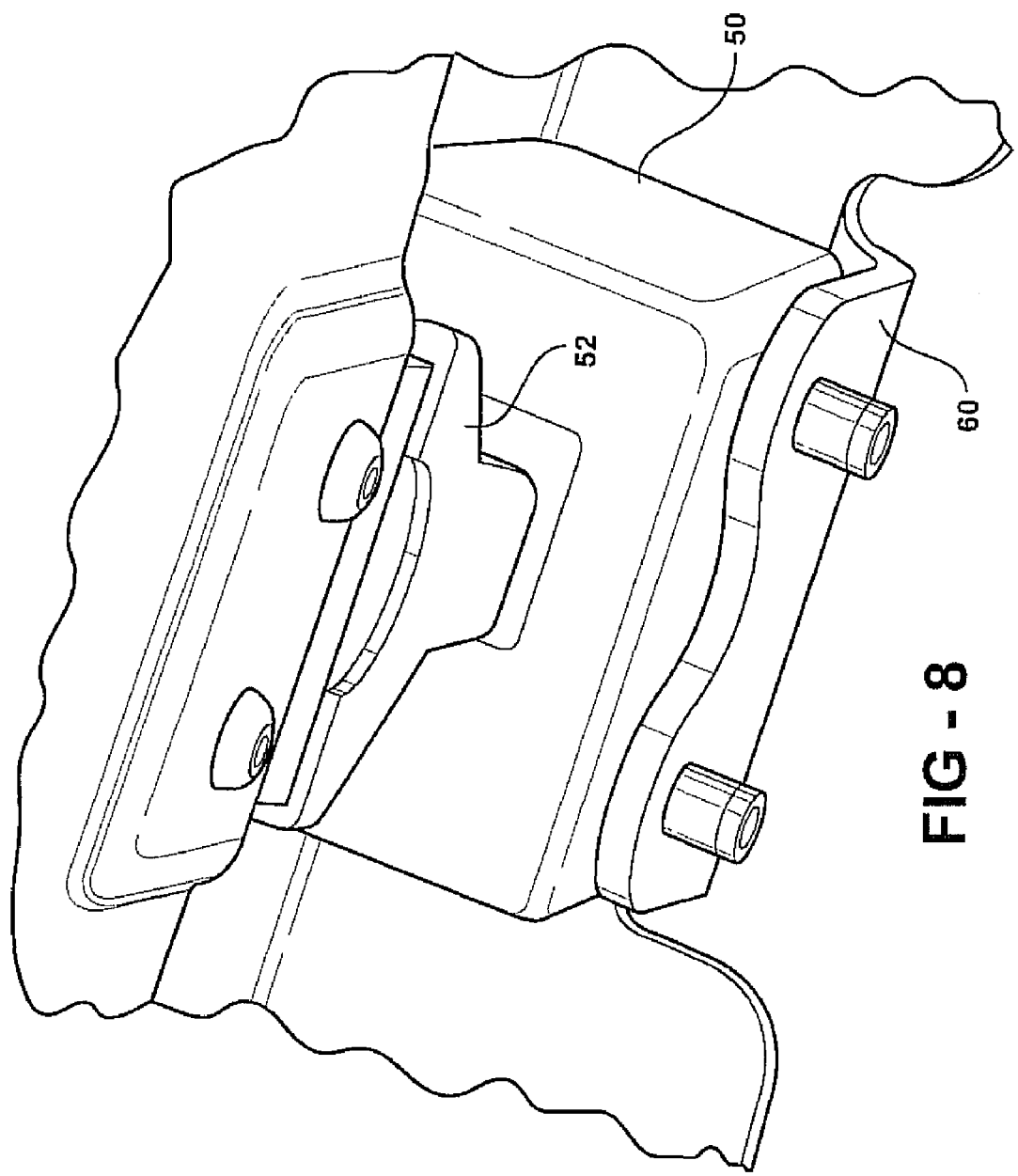
FIG. 8 is a top perspective view of a portion of the decklid assembly in the closed position showing engagement between a boss and a receiver.

As shown in FIG. 8, a receiver 50 is fixedly secured to the bracket 60. A boss 52 protrudes from the frame 14. The receiver 50 receives and guides the boss 52 to help position the decklid 10 as it moves toward the closed position.

Figure 9:
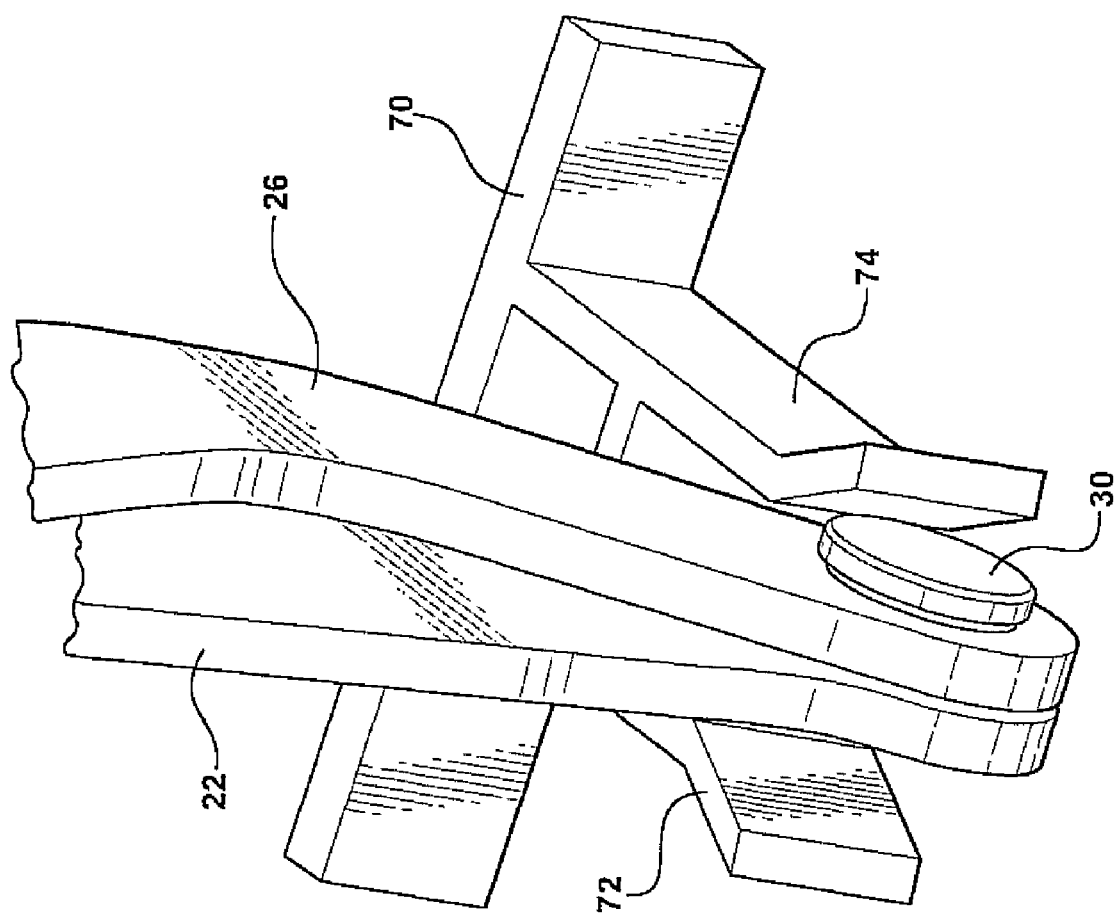
FIG. 9 is a perspective view of a guide for locating a linkage mechanism when the decklid assembly is in the closed position.

As shown in FIG. 9, a receiver or guide 70 is fixedly secured to the vehicle and has arms 72, 74 arranged in a generally V-shape for guiding the links 22, 26 as the decklid 10 moves toward the closed position. The guide 70 also provides stability to the linkage mechanism 12 when the decklid 10 is in die closed position.

In use, the decklid 10 is retained in the closed position by the overcenter arrangement in the linkage mechanism 12. Referring to FIG. 1, an overcenter line O-O is defined through the first 24 and second 28 pivots. When the third pivot 30 is positioned in an overcenter position to the right of the overcenter line O-O, the first 22 and second 26 links will tend to move in the counterclockwise direction if an attempt is made to move the decklid 10 from the closed position. In this position, however, any counterclockwise movement of the links 22, 26 is resisted by the guide 70. Alternatively, the actuator 40 may resist the counterclockwise movement of the links 22, 26 while the decklid 10 is in the closed position. Alternatively, a flange may be formed on one or both of the links 22, 26 to form a stop that resists counterclockwise movement of the links 22, 26 while the decklid 10 is in the closed position.

The decklid 10 is moved from the closed position in FIG. 1 toward the first open position in FIG. 2 by extending the actuator 40. The actuator 40 acts along a line substantially orthogonal to the overcenter line O-O when the decklid 10 is in the closed position. As shown by the intermediate positions of the decklid 10 in FIGS. 4 and 5, the second link 26 rotates clockwise about the second pivot 28 as the actuator 40 is extended. The decklid 10 and the frame 14 begin to pivot together about the decklid pivot 18 from the closed position as the third 30 pivot passes to the left of the overcenter line O-O defined by the first pivot 24 and the second pivot 28. The decklid 10 and frame 14 are maintained in the first open position in FIG. 2 by holding the actuator 40 in its fully extended position. In the first open position, the storage space may be accessed by a user or may receive a retracted convertible top therein. Optionally, the links 22, 26 and actuator 40 may be configured to have a second overcenter position to maintain the decklid in the first open position, wherein the third pivot 30 is disposed to the right side of the overcenter line O-O, as viewed from the perspective shown in FIG. 2. A flange may be formed on the bracket 60 and/or on one of the links 22, 26 adjacent to the third pivot 30 to define a hard stop for either or both of the closed and first open positions. The decklid 10 may be returned to the closed position by reversing the aforementioned steps.

Alternatively, the links 22, 26 may be pivotally coupled to each other by a multi-link mechanism instead of the single third pivot 30. In this case, the multi-link mechanism in general would be movable in and out of the overcenter position, as described above. At least one pivot in the multi-link mechanism would be movable in and out of the overcenter position to form the overcenter arrangement.

The invention has been described in an illustrative manner. It is, therefore, to be understood that the terminology used is intended to be in the nature of words of description rather than of limitation. Many modifications and variations of the invention are possible in light of the above teachings. For example, the orientation of the linkage mechanism may be reversed so that the decklid is movable relative to the frame toward the rear end of the vehicle to the first open position, while the frame remains fixed to the vehicle. In this arrangement, the decklid would then be movable together with the frame toward the front end of the vehicle to the second open position to allow trunk access from the rear end of the vehicle. As another alternative, a frameless decklid design may be provided with the linkage mechanism operating to move the decklid between a closed position and an open position. Thus, within the scope of the appended claims, the invention may be practiced other than as specifically described.

The invention claimed is:

1. A decklid assembly for use on an automotive vehicle, said decklid assembly comprising:
 a decklid;
 a frame supporting at least a portion of the decklid;
 an actuator for driving the decklid and frame together between a closed position concealing a storage space in the vehicle and a first open position allowing access to the storage space from a first end of the storage space;
 the decklid being independently movable relative to the frame between the closed position and a second open position allowing access to the storage space from a second end of the storage space opposite the first end; and
 a linkage mechanism having a first link pivotally coupled to the frame by a first pivot and a second link pivotally coupled to the vehicle by a second pivot, the first and second links being pivotally coupled to each other by a third pivot, the first and second pivots defining an overcenter line for the third pivot, one of the first and second links being coupled to the actuator for driving the linkage mechanism in a first direction during movement of the decklid and frame from the closed position to the first open position and in an opposite second direction during movement of the decklid and frame from the first open position to the closed position,
 the third pivot being movable from an overcenter position on one side of the overcenter line to an opposite side of the overcenter line as the linkage mechanism is moved in the first direction toward the first open position, the movement of the linkage mechanism being constrained in the second direction when the third pivot is in the overcenter position to help retain the decklid and frame in the closed position.

2. A decklid assembly as set forth in claim 1, wherein the decklid is coupled to the frame by an at least four-bar linkage mechanism.

3. A decklid assembly as set forth in claim 1, wherein the third pivot is movable to a second overcenter position to retain the decklid and frame in the first open position.

4. A decklid assembly as set forth in claim 1, wherein the overcenter line is substantially vertical in the closed position.

5. A decklid assembly as set forth in claim 1, wherein the first and second links are generally parallel in both the fully open and closed positions.

6. A decklid assembly as set forth in claim 1, wherein the actuator extends and retracts along a line generally orthogonal to the overcenter line.

7. A decklid assembly as set forth in claim 1 including a guide disposed adjacent the links in the closed position to resist movement of the linkage mechanism in the second direction.

8. A decklid assembly as set forth in claim 7 wherein the guide includes outwardly extending arms that receive the first and second links therebetween to guide the linkage mechanism as the frame and decklid move toward the closed position.

9. A decklid assembly as set forth in claim 1 including a bracket fixedly securing the actuator to the vehicle, the bracket further supporting a receiver that receives a boss from the frame to locate the decklid relative to the vehicle in the closed position.

10. A decklid assembly providing movement of a decklid relative to a body of an automotive vehicle, said decklid assembly comprising:
 a frame supporting at least a portion of the decklid, the frame being pivotally coupled to the body for movement of the frame and decklid together about a first decklid pivot between a closed position concealing a storage space in the vehicle and a first open position allowing access to the storage space from a first end of the storage space, the frame further providing a second decklid pivot about which the decklid is movable relative to the frame between the closed position and a second open position allowing access to the storage space from a second end of the storage space opposite the first end;
 a linkage mechanism having a first link pivotally coupled to the frame by a first pivot and a second link pivotally coupled to the vehicle by a second pivot, the first and second links being pivotally coupled to each other by a third pivot, the first and second pivots defining an overcenter line for the third pivot, the first and second links being movable in a first direction during movement of the decklid and frame from the closed position to the first open position and in an opposite second direction during movement of the decklid and frame from the first open position to the closed position; and
 the third pivot being in an overcenter position on one side of the overcenter line when the decklid is in the closed position, the third pivot moving from the overcenter position to an opposite side of the overcenter line as the linkage mechanism is moved in the first direction toward the first open position, the movement of the linkage mechanism being constrained in the second direction when the third pivot is in the overcenter position to help retain the decklid and frame in the closed position.

11. A decklid assembly as set forth in claim 10, wherein the overcenter line is substantially vertical in the closed position.

12. A decklid assembly as set forth in claim 10, wherein the first and second links are generally parallel in both the first open and closed positions.

13. A decklid assembly as set forth in claim 10 including an actuator coupled to the linkage mechanism that extends and retracts along a line generally orthogonal to the overcenter line.

14. A decklid assembly as set forth in claim 13 including a bracket fixedly securing the actuator to the vehicle, the bracket further supporting a receiver that locates the decklid relative to the vehicle in the closed position.

15. A decklid assembly as set forth in claim 14 including a boss protruding from the frame that engages the receiver to locate the decklid relative to the vehicle in the closed position.

16. A decklid assembly as set forth in claim 13, wherein the actuator is a hydraulic linear actuator.

17. A decklid assembly as set forth in claim 10 including a guide disposed adjacent the links in the closed position to resist movement of the linkage mechanism in the second direction.

18. A decklid assembly as set forth in claim 17, wherein the guide includes outwardly extending arms that receive the first and second links therebetween to guide the linkage mechanism as the frame and decklid move toward the closed position.

19. A decklid assembly as set forth in claim 10, wherein the decklid is coupled to the frame by an at least four-bar linkage mechanism for movement of the decklid relative to the frame between the closed position and the second open position.

20. A decklid assembly for use on an automotive vehicle, said decklid assembly comprising:

a decklid for covering a compartment in the vehicle; and a linkage mechanism operatively coupled between the decklid and the vehicle to provide movement of the decklid between a closed position concealing the compartment and a first open position to allow access through a first side of the compartment, the linkage mechanism further providing movement of the decklid between the closed position and a second open position to allow access through a second side of the compartment opposite the first side, the linkage mechanism being in an overcenter position when the decklid is in the closed position to prevent movement of the decklid from the closed position to one of the first and second open positions.

21. A decklid assembly as set forth in claim 20 including an actuator coupled to the linkage mechanism for moving the decklid between the closed position and at least one of the first and second open positions.

22. A decklid assembly as set forth in claim 21, wherein the actuator is a linear hydraulic actuator.

* * * * *

UNITED STATES PATENT AND TRADEMARK OFFICE
CERTIFICATE OF CORRECTION

PATENT NO. : 7,762,607 B2  Page 1 of 1
APPLICATION NO. : 11/614547
DATED : July 27, 2010
INVENTOR(S) : Frank Neubrand et al.

It is certified that error appears in the above-identified patent and that said Letters Patent is hereby corrected as shown below:

Column 1, line 35: Replace "die" with --the--; and

Column 4, line 8: Replace "die" with --the--.

Signed and Sealed this

Second Day of November, 2010

David J. Kappos
*Director of the United States Patent and Trademark Office*